United States Patent
Wishard

(10) Patent No.: US 10,439,998 B2
(45) Date of Patent: Oct. 8, 2019

(54) AUTONOMOUS SENSOR SYSTEM WITH INTRINSIC ASYMMETRIC ENCRYPTION

(71) Applicant: Bernard Wishard, Annapolis, MD (US)

(72) Inventor: Bernard Wishard, Annapolis, MD (US)

(*) Notice: Subject to any disclaimer, the term of this patent is extended or adjusted under 35 U.S.C. 154(b) by 271 days.

(21) Appl. No.: 15/272,589

(22) Filed: Sep. 22, 2016

(65) Prior Publication Data

US 2017/0085539 A1   Mar. 23, 2017

Related U.S. Application Data

(60) Provisional application No. 62/221,746, filed on Sep. 22, 2015.

(51) Int. Cl.
*H04L 29/06* (2006.01)

(52) U.S. Cl.
CPC ........ *H04L 63/0442* (2013.01); *H04L 63/061* (2013.01)

(58) Field of Classification Search
CPC .......................... H04L 63/0442; H04L 63/061
See application file for complete search history.

(56) References Cited

U.S. PATENT DOCUMENTS

| 8,639,625 B1* | 1/2014 | Ginter ..................... G06F 21/10 705/50 |
| 9,350,545 B1* | 5/2016 | Triandopoulos ........ H04L 9/321 |
| 9,971,608 B1* | 5/2018 | Venkatasamy ........ G06F 9/4418 |
| 2004/0123132 A1* | 6/2004 | Montgomery .......... G06F 21/79 726/20 |
| 2010/0177487 A1* | 7/2010 | Arshad ................... G06F 21/86 361/737 |
| 2015/0095648 A1* | 4/2015 | Nix ......................... H04W 4/70 713/170 |
| 2017/0244726 A1* | 8/2017 | Finkel ................. H04L 63/0281 |

* cited by examiner

*Primary Examiner* — Mohammed Waliullah
(74) *Attorney, Agent, or Firm* — Finnegan, Henderson, Farabow, Garrett & Dunner, LLP

(57) ABSTRACT

This disclosure relates generally to autonomous sensor systems, and more particularly to autonomous sensor system with intrinsic asymmetric encryption. In one embodiment, a device for encrypting sensor data is described. The device may include an asymmetric encryption processor, and a controller configured to encrypt the sensor data via the asymmetric encryption processor, sign the encrypted sensor data, and transmit the encrypted sensor data and the attached asymmetric key to an authenticating device.

29 Claims, 6 Drawing Sheets

AUTONOMOUS SENSOR SYSTEM WITH INTRINSIC ASYMMETRIC ENCRYPTION

This application claims priority to U.S. Provisional Application No. 62/221,746, filed on Sep. 22, 2015, which is incorporated herein by reference in its entirety.

TECHNICAL FIELD

This disclosure relates generally to autonomous sensor systems, and more particularly to an autonomous sensor system with intrinsic asymmetric encryption.

BACKGROUND

Electronic sensors are widely used for maintaining the safety, security and operation of industrial equipment and machinery. Developments in sensor technology allow industrial and other sensors to communicate with one another and/or control systems via various communications networks, including the worldwide web. The interconnectivity of sensors and components sometimes introduce security risks from malicious attacks (such as hacking, faking of sensor data and signals, etc.). In industrial control systems (ICSs) an absence of security at the sensor level has contributed to the success of attacks sometimes resulting in security risks to the public health, security of international enterprises, and the environment. When sensor data is corrupted or unavailable, regardless of whether the data is corrupted accidentally or deliberately, operators of industrial control systems (ICSs) can be virtually blind to the lack of information needed to make critical operational decisions, which could lead to catastrophic loss of life, property, or national security.

Some current sensing systems may provide security features for sensor data. When security is provided by the sensors, the security is often left to the high-layers of the network communication stack. With this approach to data security, current sensor security platforms may not guarantee authenticity of the sender. It may be difficult or impossible to determine whether the received sensor information is unaltered from the original transmission, or originates from the original transmitter at all. Since signals may be intercepted and falsified and/or altered, data integrity may be compromised because the receiving device does not know if the information originates from the authentic sensor and if the data is unaltered. In some rare instances when security is implemented at the sensor level, for example with electronic seals used in nuclear safeguards, security is often implemented using symmetric cryptography. However, symmetric cartographic keys also pose security risks that cannot be easily mitigated and may be burdensome to manage, such as, for example, potential exploitation, loss, and/or compromise of the symmetric key(s) when accessing the sensor in an untrusted or hostile environment.

Current sensing systems may also fail because sensor data may not be continuously available in prolonged disaster scenarios, due to the sensors' reliance on continuous external power. If these systems are operational at all by battery back-up, the power consumption demands of current devices are often high, due to the computational complexity of current methods of encryption. Such devices may not provide for continual autonomous operation by battery power for periods of time extending to weeks, months or even years.

It may be advantageous to provide an autonomous sensor platform (ASP) that provides data integrity, availability, authenticity, and layered security of the entire system using asymmetric data encryption at the sensor level and multiple layers of data and device security. It may be also be advantageous to provide an ASP that can provide for autonomous sensor data availability for several years without an external power source.

SUMMARY

In view of the foregoing needs, there is described in an embodiment, a device for encrypting sensor data. The device may include an asymmetric encryption processor, and a controller configured to encrypt the sensor data via the asymmetric encryption processor, sign the encrypted sensor data, and transmit the encrypted sensor data and the attached asymmetric key to an authenticating device.

According to another embodiment, there is described a method for authenticating sensor. The method may include receiving sensor data at an asymmetric encryption device, and encrypting the sensor data. The encryption may be asymmetric encryption performed at the sensor level. The method may further include signing the sensor data at the sensor level by attaching an asymmetric key, transmitting the signed sensor data to an authenticating processor, and determining, at the authenticating processor, whether the signed sensor data is authentic using the asymmetric key.

According to yet another embodiment, there is described a method for retrofitting an existing Industrial Control System (ICS) with a device for encrypting sensor data. The method may include connecting a device to at least one piece of industrial equipment within the ICS. The device used in this method may include an asymmetric encryption processor, and a controller configured to receive sensor data, encrypt the sensor data via the asymmetric encryption processor, sign the encrypted sensor data, and transmit the encrypted sensor data and the attached asymmetric key to an authenticating device.

According to another embodiment, there is described a system for authenticating data for an Industrial Control System (ICS). The system may include multiple asymmetric encryption devices. The multiple asymmetric encryption devices may include an asymmetric encryption processor, and a controller configured to receive sensor data, encrypt the sensor data via an asymmetric encryption processor, and sign the encrypted sensor data. Signing may include attaching an asymmetric key to the encrypted sensor data. The controller may be further configured to transmit the encrypted sensor data and the attached asymmetric key to an authenticating device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
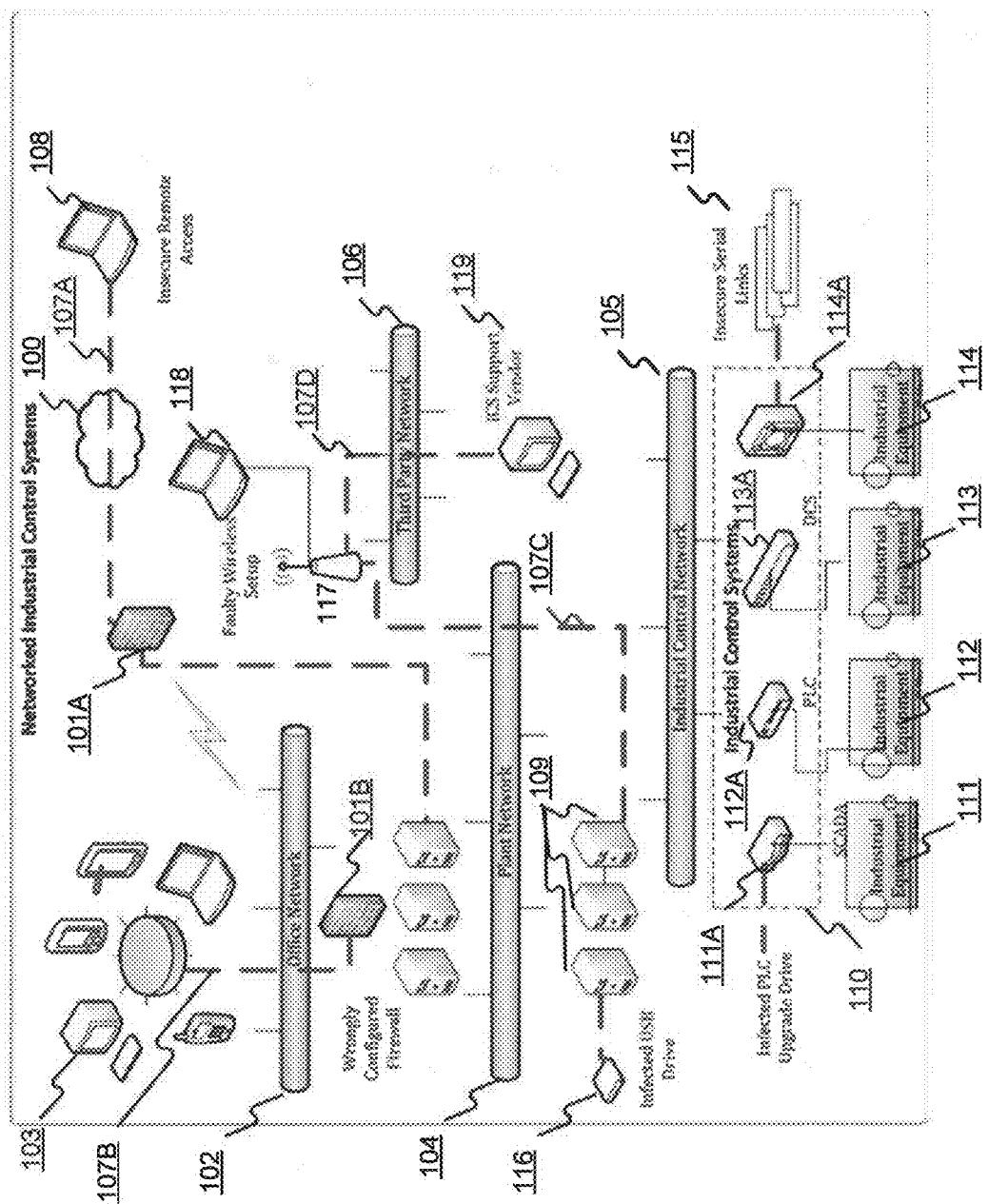
FIG. 1 illustrates exemplary industrial control system in the prior art.

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide autonomous sensor system with intrinsic asymmetric encryption. The sensor-level asymmetric encryption may provide autonomous security for sending and receiving mission-critical sensor data, regardless of the status of external power sources.

With industry-level microcontroller based sensor applications, security remains of point of concern to meet current and future cyber-threats. Systems depending on sensors for operative information are vulnerable when threat agents reach the sensor level. Few applications demonstrate the need for security more effectively than their use as electronic security sensors in monitoring whether containers, cylinders and tanks holding nuclear or other hazard materials such as wastes have been breached or opened without authorization. Existing electronic sensors often include an actively monitored loop forming a detection barrier. This loop passes short-duration signals at low frequencies when both ends are attached to the sensor. A secure system is formed when the loop is inserted into holes in the container, cylinder, or tank. In this way, the hazardous contents are continuously monitored against tampering attempts such as cutting the loop and then withdrawing the hazardous materials. However, with existing sensors the signal can intercepted, duplicated, and/or modified. One method of mitigating security risks to these electronic sensors includes implementing symmetric cryptography.

Electronic sensors must have internal logs that record sensor 'event data' which include numerous parameters such as when the sensor was applied. This event data is critical to knowing if an attacker had unauthorized access, and thus requires that the sensor be authenticated by Hosts often using a password-protected cryptographic USB tokens containing the symmetric keys. The sensors store their keys in volatile memory protected by anti-tampering mechanisms for authentication via a message authentication code (MAC), as well as for encrypting data. In this way some protection is provided that event data not been altered (the data maintains integrity) and that the sensor has not been cloned (the data maintains authenticity).

Although existing electronic security sensors using symmetric keys can provide confidentiality, authentication, and integrity they create security risks that are challenging to mitigate. Such risks include:

Potential exploitation, loss, and/or compromise of the symmetric key(s) when accessing the sensor in untrusted or high-threat environments;

The complex management of keys and their related maintenance, which exponentially increases as the number of sensors and clients grow;

Distribution of symmetric keys to sensors in untrusted environments; and

Security when sharing data between parties at different levels of trust (commonly referred to as the joint-use problem).

Other security problems arise in connection with the protection of the symmetric keys stored inside the sensors. For example, another security risk inherent to current sensor occurs when sensors are left unattended inside cyber-hostile environments. Although methods for protecting the data exist, such as storage in volatile memory, these methods are frequently ad hoc and rarely sufficient to protect against rigorous attacks. Despite the symmetric mechanism, there are security risks in high-threat environments that may be difficult to mitigate by the use of cryptographic tokens alone. Further, the management of symmetric keys can be computationally complex and resource intensive with a large number of seals used simultaneously in large industrial control systems.

Some of these issues can be explained with reference to FIG. 1, which is a prior art depiction of a typical industrial control system (ICS). An ICS can typically include one or more connected networks, including (but not limited to) the Internet 100, an office network 102, one or more plant networks 104, one or more industrial control networks 105, and one or more other third party networks 106. Networks 102, 104, 105 and 106 are often connected either directly or via one or more remote networking environments, such as, for example, the Internet 100.

Exemplary office network 102 can often include a variety of devices 103 operatively connected to and/or operating as part of an office network 102. In some instances, office network 102 may be operatively connected to a plant network 103 either directly or through an internet access point (not shown).

Plant network 103 may include locally connected devices 109 that may be operatively connected to an industrial control system 110 via industrial control network 105. For example, industrial control system 110 may include programmable logic control (PLC) drives 111A and 112A, one or more distributed control systems (DCSs) 112A-114A, and/or other industrial equipment 111-114. Industrial control system 110 may be accessible via one or more serial links 115. Serial links (e.g., serial link 115) operatively connected to industrial equipment may be insecure, and thus, may be another attack vector. Those skilled in the art appreciate that modern ICSs may include any number of interconnected devices, networks and control systems, although a limited number are depicted in FIG. 1.

Cyber-attack routes 107A-107C, depicted as a dashed lines, often originate from one or more remotely connected devices (e.g., device 108) having insecure remote access. System and network interconnections pose risks for sensor data that transits these networks, such as, e.g., office network 102, plant network 104, industrial control network 105, and a third party network 106. Without cryptographic protections the integrity of sensor data can only rely on the transport protocol, which presents clear security risk to the transmission integrity and authenticity.

The exemplary ICS of FIG. 1 depicts cyber-attack route 107A originating from device 108 and propagating through Internet network 100. Although networks (e.g., office network 102) may be insulated from internet traffic by one or more firewalls 101, malicious attackers are often skilled at discovering firewall vulnerabilities and overcoming firewall security measures. Consequently, a malicious agent can often penetrate firewalls (e.g., firewall 101A) if the firewall is improperly configured and/or maintained. Cyber-attacks may also originate from inside an office network by an internal agent with access to one or more devices. For example, an agent with malicious intent that may be operating a connected device (e.g., device 103) and may launch an attack via cyber-attack route 107B and firewall 101B, and access one or more network devices operatively connected to industrial control system 110. Likewise, an agent with physical access to an industrial programmable logic control (PLC) or computer may infect a USB drive (e.g., USB drive 116), which may then introduce malicious code into the network environment.

A faulty wireless setup (e.g., wireless access point 117) can also introduce an attack vector. For example, device 118 may access third party network 106 via cyber-attack route 107D to infect a trusted vendor working with the ICS (e.g., ICS support vendor 119). Faulty wireless access point 117 may also be used to access plant network 105 via cyber-attack route 107C, and ultimately access one or more devices 109 working as part of or connected to industrial control system 110.

Further, there are also both operational and security issues arising from the non-availability of sensor data. For example, the non-availability of critical sensor data is also a cyber-security threat with consequences indistinguishable from a malicious attack. For example, if sensor data is faked by a cyber-attack, a control system cannot make critical operative decisions with favorable results because the data may be corrupt, missing, or falsified. Similarly, if system power is lost due to a catastrophic environmental event (e.g., an earthquake or flood) and batteries powering the sensors of industrial control system 110 have been run down and are no longer operable, the non-availability of sensor data poses the same risk as that of a malicious cyber-attack.

There is a need in the security industry for asymmetric sensor encryption devices with ultra-low power requirements capable of providing autonomous battery-powered operation for periods of time extending to six years or more using standard consumer-grade dry cell batteries. Ultra-low encryption device power consumption has been incompatible with the powerful processors or microcontrollers performing the asymmetric encryption calculations. The following embodiments can provide solutions to the above-noted problems.

Computer System

Figure 2:
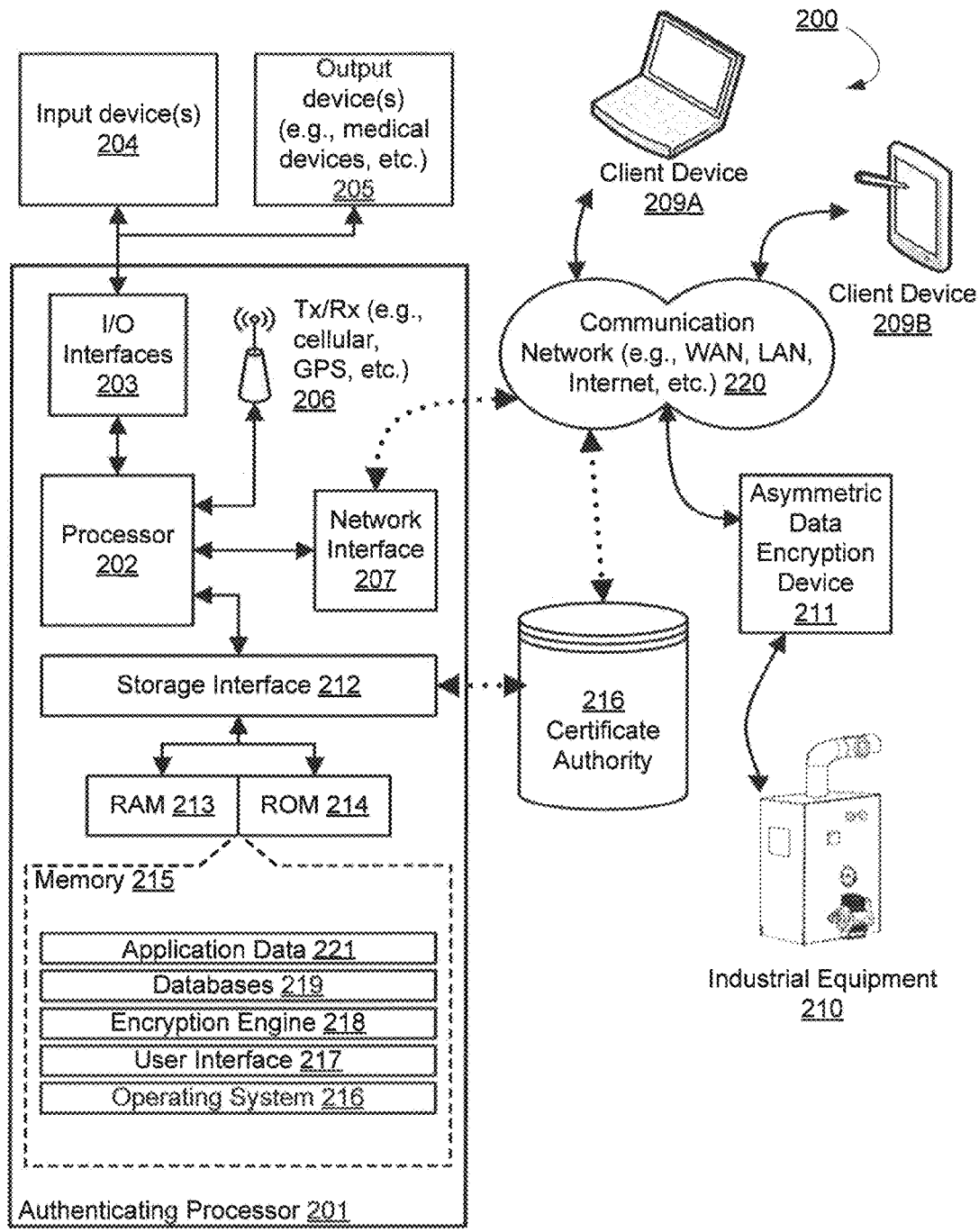
FIG. 2 is a block diagram of an exemplary computer system for implementing embodiments consistent with the present disclosure.

FIG. 2 is a block diagram of an exemplary computer system 200 for implementing embodiments consistent with the present disclosure. Variations of authenticating processor 201 may be used for implementing asymmetric data encryption device 211, certificate authority 216, and/or other computing devices associated with embodiments described herein. Authenticating processor 201 may comprise a central processing unit ("CPU" or "processor") 202. Processor 202 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, asymmetric and symmetric encryption and decryption processors, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 202 may be implemented using mainframe, distributed processor, multi-core, parallel, grid, or other architectures. Some embodiments may utilize embedded technologies like application-specific integrated circuits (ASICs) such as, for example, Atmel's (2013) 256 Hash coprocessor, Atmel ATECC508A (Atmel 2015) chip, MAX32550 chip (Maxim Integrated), digital signal processors (DSPs), Field Programmable Gate Arrays (FPGAs).

In one embodiment, the disclosed system uses the MAX32550 chip from Maxim Integrated as it (1) allows the development of electronics boards more compactly, (2) provides for a faster throughput than other commercially available chips and (3) has desired layers of security that provides even greater overall integrity of the Autonomous Sensor Platform. Non-limiting examples of the additional security includes a cryptographic engine, a true random number generator, battery-backed RTC, environmental and tamper detection circuitry.

Processor 202 may be disposed in communication with one or more input/output (I/O) devices via I/O interface 203. The I/O interface 203 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 203, authenticating processor 201 may communicate with one or more I/O devices. For example, the input device 204 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 205 may be a printer, fax machine, video display (e.g., cathode ray tube (CRT), liquid crystal display (LCD), light-emitting diode (LED), plasma, or the like), audio speaker, etc. In some embodiments, a transceiver 206 may be disposed in connection with the processor 202. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 202 may be disposed in communication with a communication network 220 via a network interface 207. The network interface 207 may communicate with the communication network 220. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 220 may include, without limitation, a direct interconnection, local area network (LAN), wide area network (WAN), wireless network (e.g., using Wireless Application Protocol), the Internet, etc. Using the network interface 207 and the communication network 220, the authenticating processor 201 may communicate with devices 209A and 209B. These devices may include, without limitation, personal computer (s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the authenticating processor 201 may itself embody one or more of these devices.

In some embodiments, the processor 202 may be disposed in communication with one or more memory devices (e.g., RAM 213, ROM 214, etc.) via a storage interface 212. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, a certificate authority 216.

The memory devices may store a collection of program or database components, including, without limitation, an operating system 216, user interface application 217, encryption engine 218, internal databases 219, and/or user/application data 221 (e.g., any data variables or data records discussed in this disclosure), etc. The operating system 216 may facilitate resource management and operation of the authenticating processor 201. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 217 may facilitate display, execution, interaction, manipulation, or operation of program components through textual or graphical facilities. For example, user interfaces may provide computer interaction interface elements on a display system operatively connected to the authenticating processor 201, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, authenticating processor 201 may store user/application data such as the data, variables, records, etc. (e.g., certificates, etc.) as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Figure 3:
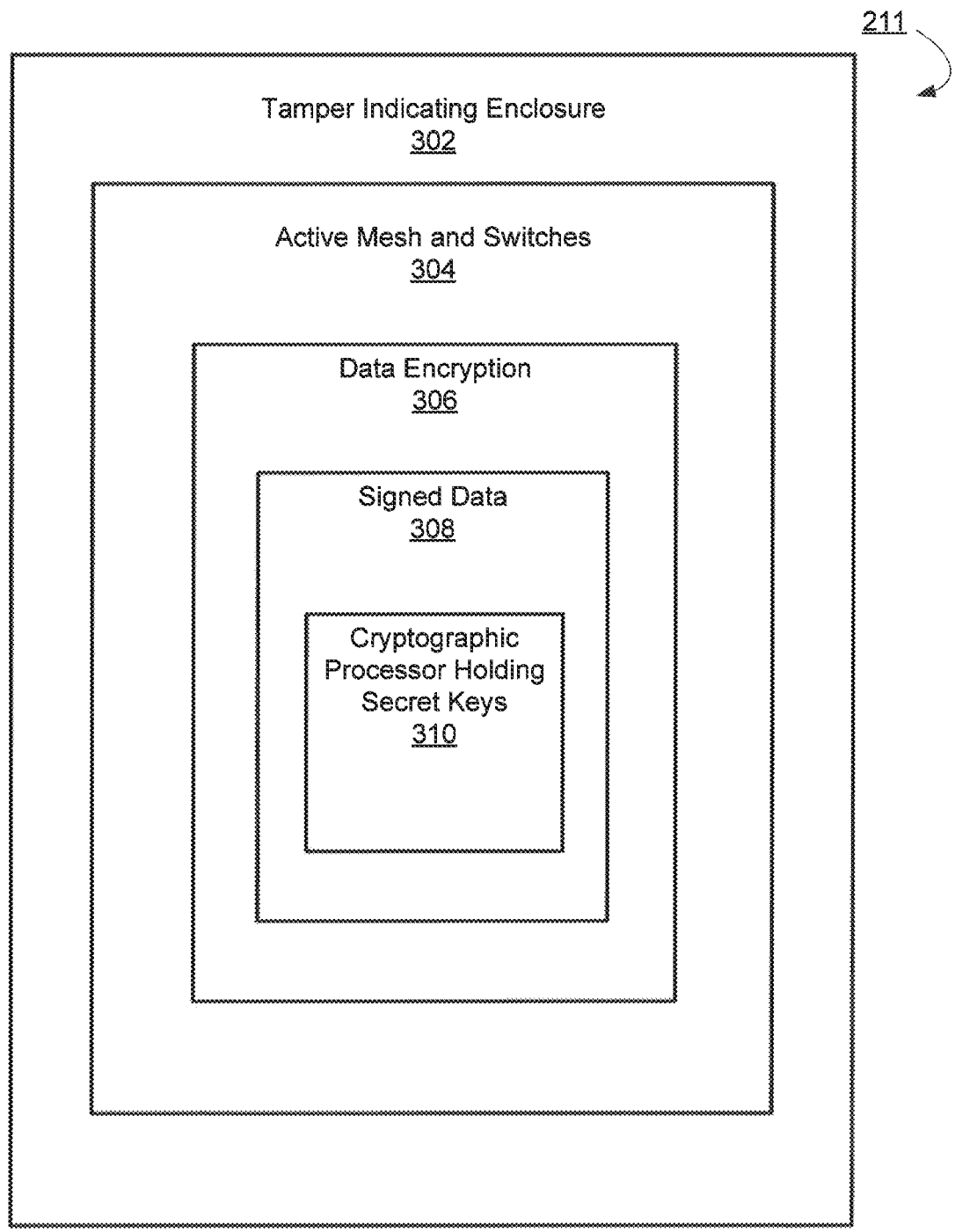
FIG. 3 is a functional block diagram of an exemplary device for asymmetric encryption, according to some embodiments of the present disclosure.

According to some embodiments, processor 202 may be in communication with one or more devices including another one or more data encryption devices 211, and/or one or more pieces of industrial equipment, such as, for example, industrial equipment 210. FIG. 3 depicts an exemplary device for asymmetric encryption 211, which is considered below in further detail.

Referring now to FIG. 3, an exemplary device for asymmetric data encryption 211 is described. Device 211 may include several nested layers of data security, including physical layers of security such as, for example, a tamper indicating enclosure 302, and active tamper mesh and switches 304. Device 211 may also include electronic processing layers of security including data encryption 306, means for digitally signing data 308, and finally one or more cryptographic processors 310, configured to hold secret keys for asymmetric encryption.

Tamper indicating enclosure 302 (hereafter "enclosure 302") is a physical device enclosure configured to mitigate the non-availability of device data due to extreme environmental conditions. For example, enclosure 302 may be configured to withstand high or low temperatures, radiation, water, chemical and/or other environmental factors that could otherwise render the internal components inoperable in a catastrophic or hostile environment. Enclosure 302 is the first barrier to the external device environment. Not only does enclosure 302 protect internal circuitry from damage, which could be inflicted either accidentally or deliberately, enclosure 302 may indicate if attackers try to open, tamper or breach its body. Enclosure 302 may be manufactured from anodized aluminum, carbon fiber, titanium, hardened steel, or other materials providing substantial protection from environmental factors.

In one embodiment, the enclosure or housing can be plastic or aluminum, such as a single piece of plastic or aluminum that has been milled to exacting requirements to fit the electronic circuit board. The choice of material for the is generally made with at least three key principles in mind: (1) Robustness; (2) Ease of implementation; and (3) Ability to build in tamper indicating features. In extraordinary circumstances such as, for example, flooding, explosion, or fire, enclosure 302 may provide sufficient protection to prevent damage to internal components.

Enclosure 302 is also tamper resistant because it may be configured to prevent side channel attacks where emanations (more particularly, electromagnetic signals and/or other emanations) could provide attackers information for a cryptographic exploit with circuit breaking switches. Further, enclosure 302 may be configured to circumvent attacks using electrostatic discharges to reset the cryptographic processor 310 into a non-functional state.

Active tamper mesh may be configured to surround device 211 just underneath the surface of tamper indicating enclosure 302. Despite the fact that the 508A securely stores cryptographic keys and other data in secure hardware if attackers gain access to the circuit they can inject false signals on to the a data-bus of device 211. Accordingly, an attacker accessing a system bus could provide a false signal, which may introduce a potential for receiving inauthentic data. Accordingly, device 211 may include circuit-breaking switches on the enclosure 302 in series with active tamper mesh that protects the circuit board from unauthorized access. Any attempt to tamper the circuit from the outside the enclosure would necessarily require cutting an active (serpentine) mesh. Alternatively, opening tamper indicating enclosure 302 can also break the one or more micro-switch circuits configured as part of the internal bus. Thus, unauthorized access by opening enclosure 302 renders device 211 inoperable, which would eliminate an attack vector and trigger forensic investigation by an authorized party.

Device 211 may provide a further layer of data protection that includes data encryption means 306. More particularly, data encryption means 306 provides means for public-key encryption of any data originating from device 211. Public-key cryptography, also known as asymmetric cryptography, is a class of cryptographic protocols based on algorithms that generally require two separate keys, one of which is secret (or private) and one of which is public. Although different, the two parts of this key pair are mathematically linked. The public key may be stored on a certificate authority, for example, certificate authority 216, and may be used to encrypt plaintext, sensor data, and/or to verify a digital signature. The private key may be used for the opposite operation, for example, to decrypt cipher text or to create a digital signature on sensor data. The term "asymmetric" stems from the use of different keys to perform these opposite functions, each the inverse of the other—as contrasted with conventional ("symmetric") cryptography which relies on the same key to perform both.

Public-key algorithms are based on mathematical problems that currently admit no efficient solution and are inherent in certain integer factorization, discrete logarithm, and elliptic curve relationships. Therefore, it is computationally easy for a user to generate a public and private key-pair and to use it for encryption and decryption. The strength of asymmetric encryption lies in the "impossibility" (computational impracticality) for a properly generated private key to be determined from its corresponding public key. Thus the public key may be published without compromising security. Security, then, depends only on keeping the private key private. Public key algorithms, unlike symmetric key algorithms, do not require a secure channel for the initial exchange of one (or more) secret keys between the parties.

Because of the computational complexity of asymmetrical encryption, it has historically been used only to transfer a symmetrical encryption key by which the message (and usually the entire conversation/data stream) is encrypted. Smaller devices and devices dependent on limited battery power resources have typically used symmetrical encryption/decryption, because they are generally based on simpler algorithms and can be relatively faster and require low power compared to asymmetric encryption. Data authentication involves hashing the message to produce a "digest," and encrypting the digest with the private key to produce a digital signature. Thereafter anyone can verify this signature by (1) computing the hash of the message, (2) decrypting the signature with the signer's public key, and (3) comparing the computed digest with the decrypted digest. Equality between the digests confirms the message is unmodified since it was signed, and that the signer, and no one else, intentionally performed the signature operation—presuming the signer's private key has remained secret to the signer. The algorithm used for asymmetric keys may use an Elliptic Curve Digital Signature Algorithm (ECDSA), or other suitable algorithm for asymmetric encryption. As discussed in further detail with respect to FIG. 4, device 211 may include an asymmetric encryption processor configured to manage the asymmetric key standards.

Device 211 may include data encryption means 306 configured to provide asymmetric encryption to data sent from device 211. Device 211 may also include a means for digitally signing data 308.

Signed data means 308 may provide a digital signature for data originating from device 211. Digital signatures are a mathematical scheme for demonstrating the authenticity of a digital message or document. A valid digital signature can provide a recipient reason to believe that the message was created by a known sender, that the sender cannot deny having sent the message (authentication and non-repudiation), and that the message was not altered in transit (integrity).

Cryptographic processor 310 may provide asymmetric encryption by digitally signing using known signature algorithms, such as, for example, ECDSA (P256 curve). The cryptographic processor 310 (which is discussed in further detail with respect to FIG. 4) stores secret keys and certificates internally in protected hardware.

Figure 4:
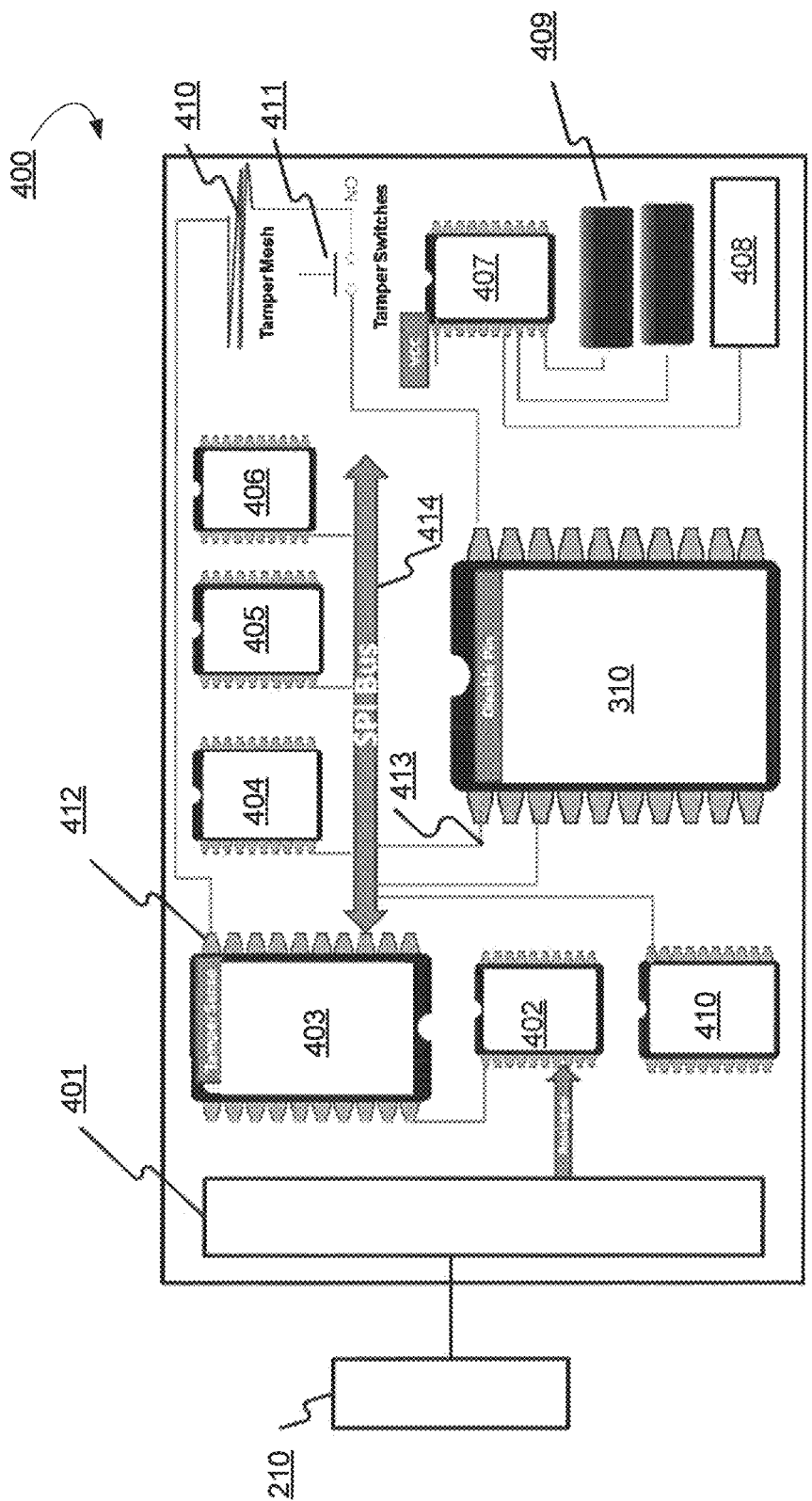
FIG. 4 is an exemplary device for asymmetric encryption, according to some embodiments of the present disclosure.

Referring now to FIG. 4, an exemplary device for asymmetric encryption 211 (hereafter "device 211") is considered in further detail. Device 211 may be in direct and operative communication with industrial equipment 210, and may be configured to receive operational information from industrial equipment 210. Device 211 may include a transducer 401, an amplifier 402, a tamper resistant microcontroller 403 (hereafter "microcontroller 403"), a cryptographic processor 310, a clock 404, external memory 405, a network adaptor 406, a power multiplexer (power MUX) 407, an external power port 408, and an autonomous power receptacle 409. A power receptacle is autonomous in that it can receive a battery suited to provide power autonomously to device 211 in the absence of operative power provided through external power port 408. Device 211 may also include circuit-breaking security features including active tamper mesh 410 and tamper switches 411.

Transducer 401 can convert one form of energy, for example, energy received from industrial equipment 210, to another form of energy. For example, transducer 401 may be configured to receive inputs including (but not limited to) electromagnetic inputs, electrochemical, electromechanical, electroacoustic, electro-optical (photoelectric), electrostatic, thermoelectric, radio-acoustic and/or other types of inputs. For example, transducer 401 may be an antenna, a magnetic cartridge, a tape head, a read-and-write head, a hall effect sensor, a pH probe, an electro-galvanic fuel cell, a hydrogen sensor, an electroactive polymer, a galvanometer, a microelectromechanical sub-system, a rotary motor, a linear motor, a vibration powered generator, a potentiometer, a linear variable differential transformer, a rotary variable differential transformer, a load cell that converts force to an electrical signal using a strain gauge, a strain gauge, an accelerometer, a string potentiometer, an air flow sensor, a tactile sensor, a microphone, a piezoelectric crystal, a geophone, a hydrophone, a sonar transponder, an ultrasonic transceiver, a photodiode, a laser diode, a photo-resistor, an electrometer, a resistance temperature detector (RTD), a thermocouple, thermistor, a Geiger-Muller tube, a radio receiver, and/or a transmitter. Although a broader range of transducers are contemplated, those skilled in the art appreciate that transducer 401 may be any of a number of devices not listed herein.

Transducer 401 converts a signal in one form of energy to a signal in another (for example, a loudspeaker converts an electric signal to sound), but any variable attenuation of energy may serve as input. For example, the light reflecting off equipment 210, although it is not a signal, conveys information that a light sensing transducer can convert. Transducer 401 may be configured as sensor, and used to detect an operational parameter in one form and transmit information in connection with that parameter as another form of energy, often an electrical signal. For example, if transducer 401 is configured as a pressure sensor, it may detect pressure (a mechanical form of energy) and convert it to electrical signal for display by a digital gauge that is receiving the signal. Transducers are widely used in measuring instruments. Device 211 may be configured to be a generic platform for all types of transducers such as pressure, temperature, motor controllers, and switch position indicators. In essence, device 211 can be configured to include any sensor type for transducer 401 as needed for industrial or other safety and/or security systems. Transducer 401 may detect an operational parameter and transmit the analog signal indicative of the parameter to amplifier 402. Amplifier 402 may amplify the signal for transmission and processing by tamper resistant microcontroller 403.

Tamper resistant microcontroller 403 may be a mixed-signal microcontroller (such as, for example, a MSP430 is a mixed-signal microcontroller family Texas Instruments™) Microcontroller 403 may be configured for low power consumption embedded applications. For example, microcontroller 403 may be configured for current drawn in idle mode to be less than 1 μA. Microcontroller 403 may include a plurality of low-power modes that can disable unneeded clock operational in device 211, and disable and/or limit CPU operation (e.g., microelectronic controller 403 and/or cryptographic processor 310. Additionally, microcontroller 403 is capable of wake-up times below 1 microsecond, allowing the microcontroller to stay in sleep mode longer, and minimize the rate of power consumption by device 211.

According to some embodiments, cryptographic processor 310 may utilize embedded technologies like application-specific integrated circuits (ASIC s) including, for example, Atmel's (2013) 256 Hash coprocessor, Atmel ATECC508A (Atmel 2015) chip, digital signal processors (DSPs), Field Programmable Gate Arrays (FPGAs), etc. Cryptographic processor 310 may be configured to store secret keys and certificates internally in protected hardware. More particularly, cryptographic processor 310 may include memory segregated into a predetermined number of memory blocks (e.g., 16 blocks), which may hold up to the same predetermined number of secrets.

According to embodiments herein, cryptographic processor 310 can be configured for ultra-low power consumption. For example, cryptographic processor 310 can operate with a predetermined maximum power consumption in the milliamp region, and can be configured to sleep when not operating. The sleep function may require only 50-nanoampere of current in sleep mode. According to some embodiments, the predetermined maximum power consumption is less than or equal to about 60 microamp-hours in non-sleep mode. According to other embodiments, the predetermined maximum power consumption is less than or equal to 50 microamp-hours in non-sleep mode. In yet other embodiments, the predetermined maximum power consumption does not exceed 40 microamp-hours during non-sleep mode.

Cryptographic processor 310 may include security features capable of disabling the processor, such as a disable pin 413. When disable pin 413 is set low (e.g., is fed a low voltage signal), Cryptographic processor 310 becomes disabled, thus locking-out access to private keys. Cryptographic keys stored in integrated memory blocks (not shown) are protected when, for example, one or more tamper switches 411 or active tamper mesh 410 protecting the circuit board is cut. A cut circuit board produces low voltage signal to disable pin 413.

Clock 404 may provide precise time for processor 310 and/or 403, and may provide the time and date for logging security events. Clock 404 may include very high time precision and accuracy, for example, accuracy to seven parts in a million. Clock 404 can update microcontroller 403 to ensure that there is no drifting of event times.

External memory 405 may be an external memory capable of resisting environmental hazards such as, for example, radiation. Accordingly, external memory 405 may be ferroelectric RAM (FRAM), which has a higher tolerance for large number reading/writing without degradation. Additionally, FRAM is known to have a high radiation tolerance in comparison with other types of computer memory, which can preserve the integrity of data stored on external memory 405 in the presence of radio energy.

Network adapter 406 may provide device 211 with Ethernet and RS-485 connectivity. Accordingly, device 211 may connect to a control system configured to monitor the operational signals transmitted from device 211 via wired or wireless connection.

Network adapter 406 may include a system bus 414 that operatively connects system components of device 211.

Power multiplexer (MUX) 407 may be an ultra-low power multiplexing chip configured to provide, in conjunction with a conventional battery power source, continuous autonomous operation for long periods of time that can extend into years. Power MUX 407 may also receive power from external power port 408. According to some embodiments, power MUX 407 may compare autonomous power receptacle 409 with external power port 408, and select the power source with the highest available voltage (e.g., either autonomous power receptacle 409 configured with operable batteries (not shown), or external power port 408 if external wired power is available), and switch the power circuit to the highest available voltage. Power MUX 407 may be configured to switch the power source seamlessly without taxing computational resources of microcontroller 403. Moreover, power MUX 407 may continually monitor the voltage of all operatively connected power sources including external power port 408 and autonomous power receptacle 409, and switch to a higher voltage source. Alternatively, according to some embodiments, power MUX 407 may periodically check the respective voltages after a predetermined time interval.

Device 211 may also include circuit-breaking security features that may include active tamper mesh 410 and tamper switches 411. Accordingly, if either active tamper mesh 410 or one or more tamper switches 411 are open (e.g., the circuit is broken), the low voltage signals going to tamper sense pin 412 on microcontroller 403, and disable pin 413 on cryptographic processor 310, respectively, disable processing, and log a security event by saving information in connection with the security event on external memory 405.

Figure 5:
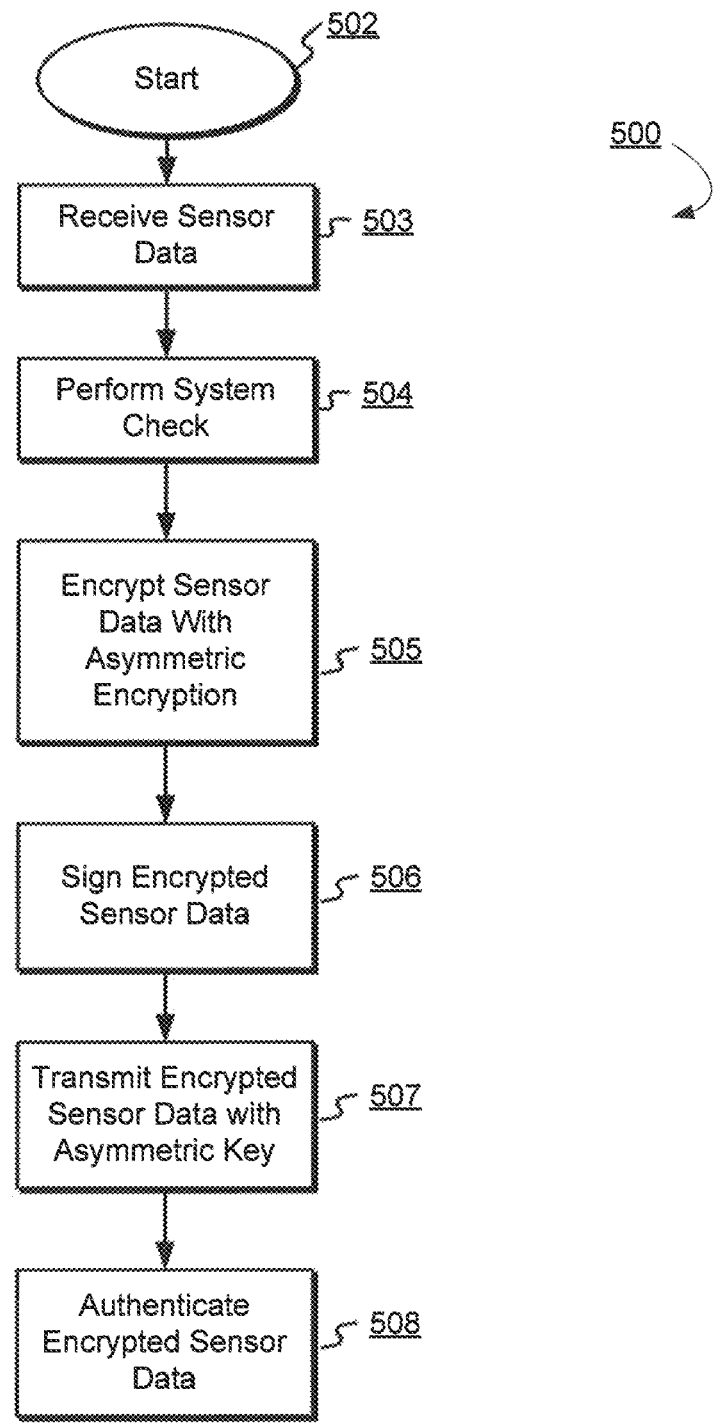
FIG. 5 is a flow diagram illustrating an exemplary method for authenticating sensor data with the device of FIG. 4, in accordance with some embodiments of the present disclosure.
Figure 6:
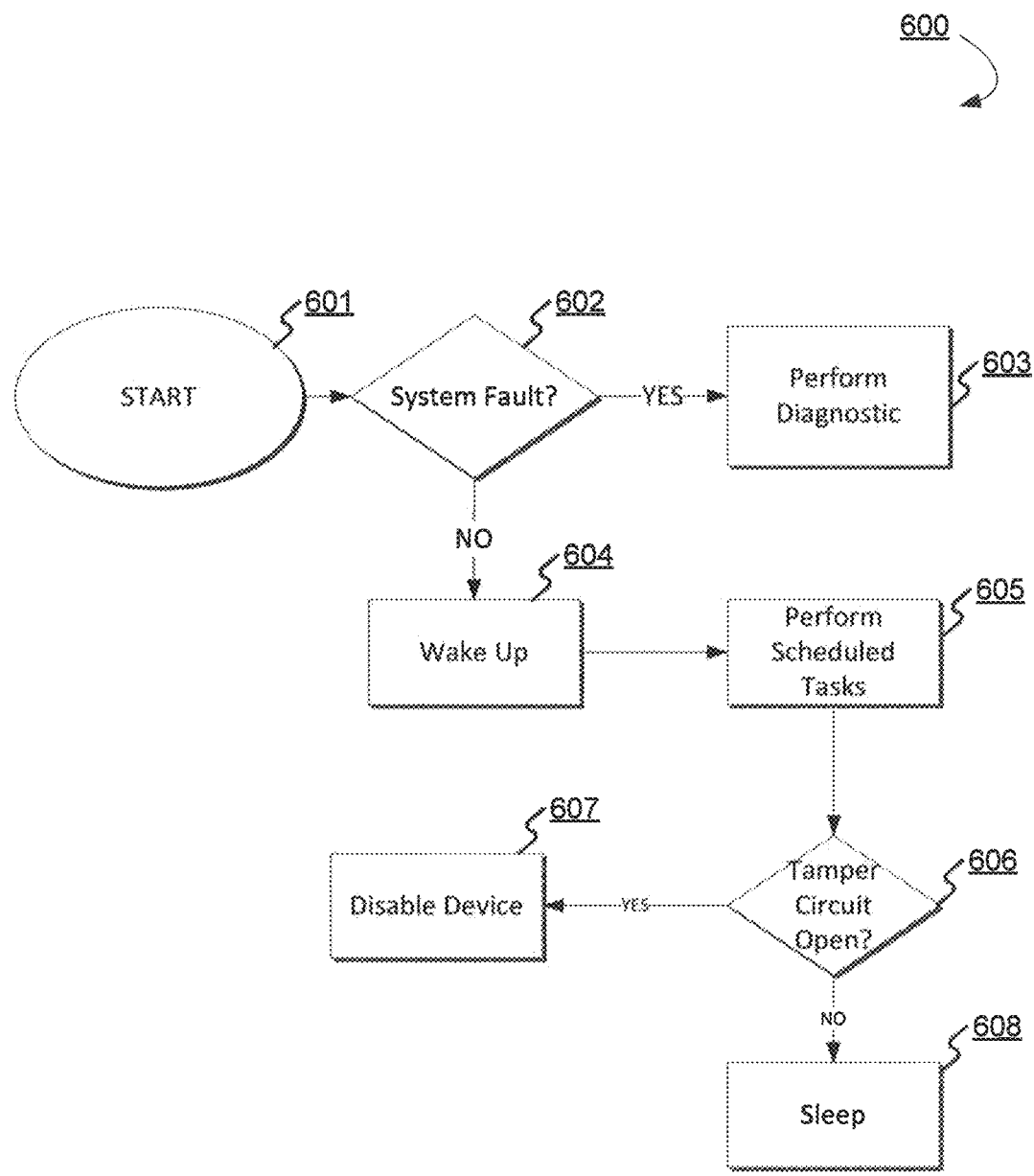
FIG. 6 is a flow diagram illustrating an exemplary method for performing a system check of the device of FIG. 4, in accordance with some embodiments of the present disclosure.

FIG. 5 describes an exemplary method for evaluating intermediate data (hereafter "method 500" or "process 500"), according to some embodiments of the present disclosure. Referring now to FIG. 5, after an initial starting step 502, device 211 may receive sensor data (step 503) from an operatively connected transducer (e.g., transducer 401). According to some embodiments, transducer 401 may be operatively connected to industrial equipment (e.g., industrial equipment 210), and may read analog and/or digital information in connection with the operation of industrial equipment 210. Device 211 may feed the analog and/or digital information to amplifier 402, amplify the information to a predetermined amplitude, and provide the information via a bus to tamper resistant microcontroller 403. At step 504, device 211 may perform a system check. FIG. 6 depicts an exemplary method for performing a system check, according to some embodiments of the present disclosure.

Referring now to FIG. 6, after an initial start step 601, device 211 may determine whether a system fault has occurred (step 602). A system fault may include software or hardware failure rendering device 211 incapable of performing one or more requested and/or scheduled tasks.

According to some embodiments, if device 211 determines that it is in a system fault condition, device 211 may perform a diagnostic process that includes, but is not limited to, a software, hardware, and/or device communication check. If device 211 determines that it has not experienced a fault condition, at step 604 device 211 may wake up from system sleep.

Device 211 may power down with a minimal power usage while in system sleep. Minimal power usage may include operation at a predetermined maximum power consumption as described herein. At step 604, device 211 may wake up from a minimal power usage condition and operate at a second maximum power consumption that is higher than the sleep condition.

At step 605, device 211 may perform one or more scheduled tasks. Scheduled tasks may include, but are not limited to reading a signal from transducer 401, checking batteries installed in autonomous power receptacle 409, checking temperature, checking system time on clock 404, updating cryptographic processor 310 with a correct time, checking external memory 405, and/or checking the circuit condition of all tamper indicating switches (e.g., active tamper mesh 410 and tamper switches 411).

At step 606, device 211 may determine whether the circuit condition of the tamper indicating switches are indicative of a failure condition. A failure condition may include evidence of tampering that broke one or more circuits of device 211. For example, a failure condition may exist if device 211 was opened and one or more tamper switches 411 have been opened. As another example, if a probe was inserted into device 211 in an attempt to access a system bus (e.g., system bus 414), active tamper mesh 410 can be pierced, which would open the mesh circuit. Accordingly, disable pin 413 on cryptographic processor 310 will pull low voltage relative to its normal operating voltage and disable cryptographic processor 310. Tamper sense pin 412 on tamper resistant microcontroller 403 will also pull low voltage relative to its normal operating voltage and disable microcontroller 403.

At step 606, if device 211 determines that the tamper indicating switches 210 and 211 are indicative of a failure condition, device 211 may write information indicative of the security event (the failure condition) to external memory 405 and disable operation of microprocessor 403 and cryptographic processor 310.

At step 608, if tamper circuits are not open, device 211 may return to a sleep mode.

Referring again to FIG. 5, after performing a system check (step 504), device 211 may encrypt the sensor data with asymmetric encryption. The asymmetric encryption performed by device 211 is performed at the sensor level (directly after transducer 401 transduces the operational information and provides the transduced information to amplifier 402). Because transducer 401 is integral with device 211, all attack vectors have been eliminated between the receipt of the information and the encryption of the information. Accordingly, sensor-level encryption mitigates and/or eliminates the possibility of data corruption or interception before the information is electronically signed by device 211. Device 211 may sign the sensor data (the information received from transducer 401) by attaching an asymmetric key to the data.

At step 507, device 211 may transmit the signed sensor data that is asymmetrically encrypted, to an authenticating processor (e.g., authenticating processor 201). Authenticating processor 201 may be located locally (as part of the same local network as device 211), or may be remotely located. At step 508, authenticating processor 201 may determine whether the signed sensor data is authentic using the asymmetric key.

According to some embodiments, device 211 may be connected to and used to authenticate data for an ICS in one or more industrial sectors. For example, device 211 may be configured to authenticate data in the chemical industry, in commercial facilities, in communications applications, in manufacturing environments for critical manufacturing, in infrastructure such as, for example, dams, in defense industrial bases, in emergency services, in energy, in financial services, in food industrial applications, in agriculture, in government facilities, in healthcare facilities and applications, in information technology applications, in nuclear applications including nuclear arms manufacturing and nuclear power production, in transportation industries, in aerospace, space, and avionics applications, and in water and waste management applications. Those skilled in the art appreciate that these applications are exemplary only and do not limit the scope of industrial applications for embodiments disclosed herein.

The specification has described an autonomous sensor system with intrinsic asymmetric encryption. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium"

should be understood to include tangible items and exclude carrier waves and transient signals, i.e., are non-transitory. Examples include random access memory (RAM), ferroelectric random access memory (FRAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A device for encrypting sensor data comprising:
   an asymmetric encryption processor; and
   a controller configured to: receive sensor data; encrypt the sensor data via the asymmetric encryption processor; sign the encrypted sensor data; and transmit the encrypted sensor data and the attached asymmetric key to an authenticating device,
   the device further comprises a tamper-proof enclosure to house the asymmetric encryption processor, or the controller, or both, wherein the tamper-proof enclosure detects a breach, and circumvents said breach using at least one electrostatic discharge to place the device into a non-functional state.

2. The device of claim 1, wherein signing the encrypted sensor data comprises attaching an asymmetric key to the encrypted sensor data.

3. The device of claim 1, further comprising an autonomous power source configured to supply power to the device sufficient to operate the device for a predetermined period of time.

4. The device of claim 3, wherein the predetermined period of time is at least 4 years.

5. The device of claim 4, wherein the predetermined period of time is at least 5 years.

6. The device of claim 1, wherein the asymmetric encryption processor and the controller are operable with a predetermined maximum power consumption.

7. The device of claim 6, wherein the predetermined maximum power consumption is less than or equal to about 60 microamp-hours.

8. The device of claim 1, wherein the controller is further configured to transmit a periodic heartbeat signal that includes information indicative of whether a security breach was attempted on the controller.

9. The device of claim 8, wherein responsive to determining that a security breach was attempted, the controller is further configured to: create event data; encrypt the event data via the asymmetric encryption processor; sign the encrypted event data, wherein signing comprises attaching an asymmetric key to the encrypted event data; and store the encrypted event data and on an operatively connected computer memory.

10. The device of claim 1, wherein the tamper-proof enclosure is sufficient to prevent side channel attacks.

11. The device of claim 1, wherein the tamper-proof enclosure comprises aluminum or plastic.

12. The device of claim 1, wherein the tamper-proof enclosure comprises a single piece of material that has been milled to fit the asymmetric encryption processor, or the controller, or both, wherein said enclosure is resistant to damage from at least one of water, fire, radiation, or explosions.

13. The device of claim 1, further comprising at least one layer of active tamper mesh material located between the tamper-proof enclosure and the asymmetric encryption processor.

14. A method for authenticating sensor data using the device of claim 1, comprising:
   receiving sensor data at an asymmetric encryption device; encrypting the sensor data, wherein the encryption is asymmetric encryption performed at the sensor level; signing the sensor data at the sensor level by attaching an asymmetric key; transmitting the signed sensor data to an authenticating processor; and determining, at the authenticating processor, whether the signed sensor data is authentic using the asymmetric key.

15. The method of claim 14, further comprising transmitting a periodic heartbeat signal.

16. The method of claim 15, further including determining, via the periodic heartbeat signal, whether a security breach was attempted on the originating encryption device.

17. The method of claim 16, wherein responsive to determining that a security breach was attempted, the method further comprises:
   creating event data; encrypting the event data with the asymmetric encryption processor;
   signing the encrypted event data, wherein signing comprises attaching an asymmetric key to the encrypted event data; and storing the encrypted event data and on an operatively connected computer memory.

18. The method of claim 14, wherein the sensor data is received from a sensor located in an Industrial Control System (ICS).

19. A method for retrofitting an existing Industrial Control System (ICS) with a device for encrypting sensor data according to claim 1, said method comprising connecting to at least one piece of industrial equipment within the ICS, a device comprising:
   an asymmetric encryption processor; and
   a controller configured to: receive sensor data; encrypt the sensor data via the asymmetric encryption processor; sign the encrypted sensor data; and transmit the encrypted sensor data and the attached asymmetric key to an authenticating device.

20. The method of claim 19, wherein signing the encrypted sensor data comprises attaching an asymmetric key to the encrypted sensor data.

21. The method of claim 19, further comprising an autonomous power source configured to supply power to the device sufficient to operate the device for a predetermined period of time.

22. The method of claim 19, wherein the asymmetric encryption processor and the controller are operable with a predetermined maximum power consumption.

23. The method of claim 19, wherein the predetermined maximum power consumption is less than or equal to about 60 microamp-hours.

24. The method of claim 19, wherein the controller is further configured to transmit a periodic heartbeat signal that includes information indicative of whether a security breach was attempted on the controller.

25. The method of claim 19, wherein responsive to determining that a security breach was attempted, the controller is further configured to:
   create event data; encrypt the event data via the asymmetric encryption processor;
   sign the encrypted event data, wherein signing comprises attaching an asymmetric key to the encrypted event data; and store the encrypted event data and on an operatively connected computer memory.

26. A system for authenticating data for an Industrial Control System (ICS) comprising:
multiple asymmetric encryption devices comprising the device of claim 1 having
an asymmetric encryption processor; and
a controller configured to: receive sensor data; encrypt the sensor data via an asymmetric encryption processor; sign the encrypted sensor data, wherein signing comprises attaching an asymmetric key to the encrypted sensor data; and transmit the encrypted sensor data and the attached asymmetric key to an authenticating device.

27. The system of claim 26, further comprising a data decryption device comprising a processor configured to: receive the signed event data via the processor; and determine, using the asymmetric key, whether the encrypted sensor data is authentic.

28. The system of claim 26, wherein the multiple asymmetric encryption devices are connected to various pieces of equipment within the ICS.

29. The system of claim 26, which is connected to and used to authenticate data for an Industrial Control System in at least one of the following sectors: Chemical Industry; Commercial Facilities; Communications; Critical Manufacturing; Dams; Defense Industrial Base; Emergency Services; Energy; Financial Services; Food & Agriculture; Government Facilities; Healthcare; Information Technology; Nuclear; Transportation System; and Water & Waste Management.

* * * * *